Feb. 23, 1954
H. A. DORMAN ET AL
2,670,055
SUPERCHARGING AIR INDUCTION FILTER
DEVICE FOR AUTOMOTIVE ENGINES
Filed Sept. 27, 1948
2 Sheets-Sheet 2
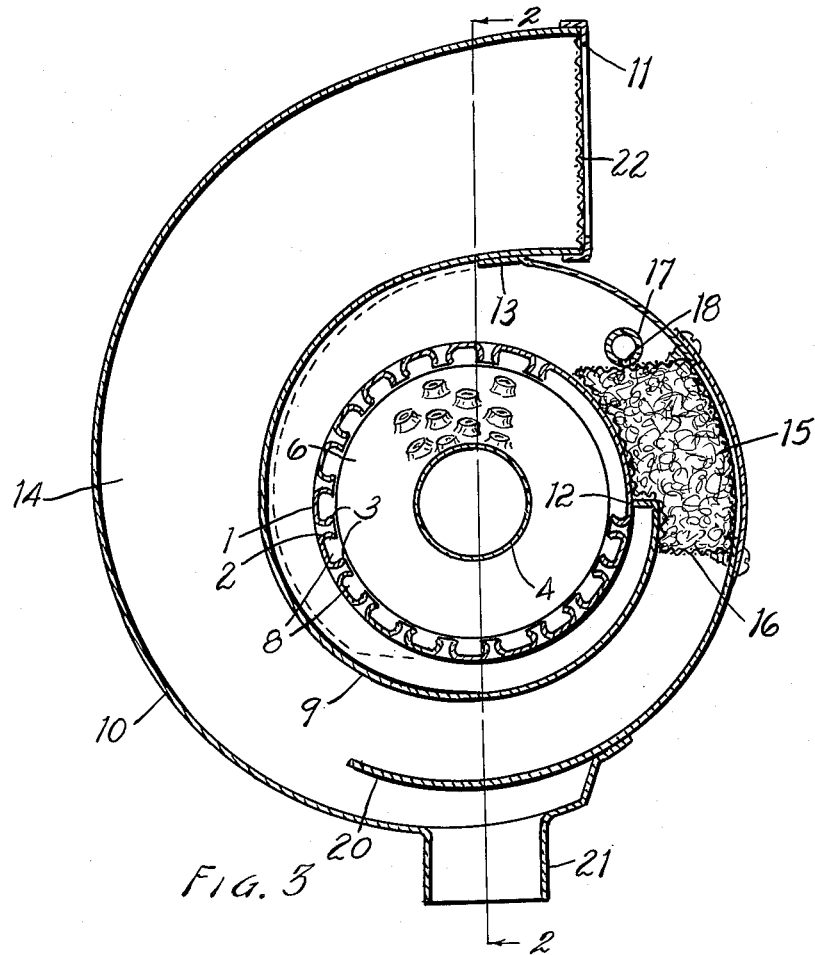
FIG. 3
FIG. 4
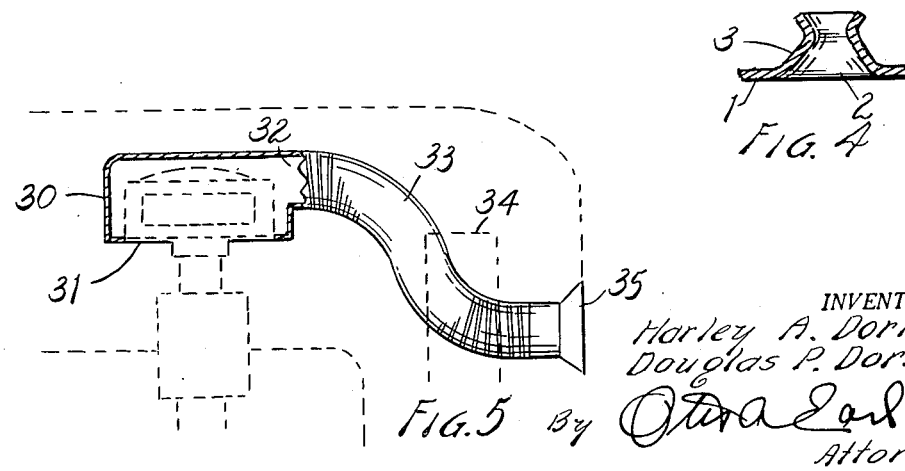
FIG. 5
INVENTOR.
Harley A. Dorman
Douglas P. Dorman
By
Attorney.

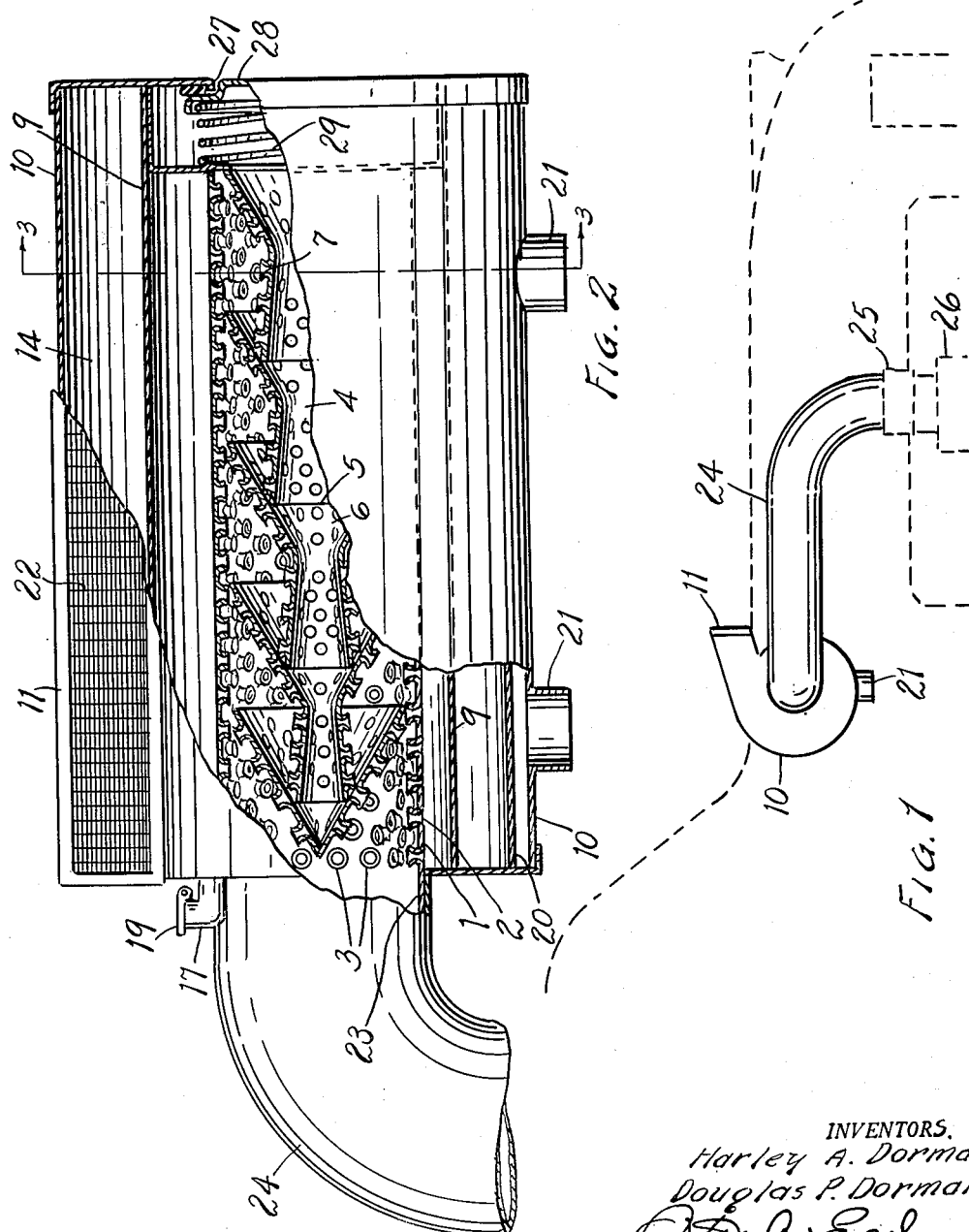

Patented Feb. 23, 1954

2,670,055

UNITED STATES PATENT OFFICE 2,670,055

SUPERCHARGING AIR INDUCTION FILTER
DEVICE FOR AUTOMOTIVE ENGINES

Harley A. Dorman, Detroit, Mich., and Douglas P.
Dorman, Los Angeles, Calif.

Application September 27, 1948, Serial No. 51,392

5 Claims. (Cl. 183—80)

This invention relates to improvements in supercharger for automotive engines.

The principal objects of this invention are:

First, to provide a supercharger for the engines of automobiles and the like which will increase the operating efficiency of the engine particularly at higher road speeds of the automobile.

Second, to provide a supercharger for automotive engines which is silent in operation.

Third, to provide a supercharger for automotive engines which also functions to filter dust and foreign particles from the air supplied to the engine.

Fourth, to provide a supercharger which can be applied either as an accessory on existing automobile engines as well as new equipment for new automobiles.

Fifth, to provide a supercharger which is little affected or liable to become clogged by snow or ice or other obstructions collecting around the intake.

Other objects and advantages of our supercharger will be apparent from a consideration of the following description and attached drawings. The invention is further pointed out in the claims.

The drawings, of which there are two sheets, illustrate two forms of our supercharger.

Fig. 1 is a side elevational view of the supercharger applied to the carburetor of an automobile, the automobile and carburetor being indicated generally by dotted lines.

Fig. 2 is a fragmentary front elevational view of the supercharger, partially broken away in vertical cross section along the plane of the line 2—2 in Fig. 2.

Fig. 3 is a transverse vertical cross sectional view through the supercharger taken along the plane of the line 3—3 in Fig. 2.

Fig. 4 is a fragmentary enlarged detailed cross sectional view through one of the several air passages in the supercharger.

Fig. 5 is a side elevational view, partially broken away in vertical cross section and illustrating a modified form of supercharger as applied as an accessory to an existing carburetor and air cleaner, the air cleaner and carburetor being shown conventionally.

We are aware that it has previously been proposed to collect the air for operation of an automobile engine from a point behind or otherwise affected by the air stream of the fan of the engine and conduct this air through a conduit to the carburetor of the engine in an attempt to provide a positive pressure supply of air to the carburetor. These previous proposals are effective to a limited degree only because the fan of an automobile engine becomes inefficient and, in fact, inoperative to produce an increased air pressure above certain moderate operating speeds of the automobile.

It is our proposal to accumulate air from a portion of the slip stream of the automobile and conduct this air through a conduit of reduced cross section to the carburetor. By the term "slip stream" we refer to any position on or within the body of the automobile where the movement of the automobile creates a relative flow of air past the automobile. This may be at the front of the automobile directly behind the conventional radiator grill as shown in Fig. 5, or immediately above the cowl and in front of the windshield of the automobile as shown in Fig. 1, or in other positions as desired.

The supercharger illustrated in Figs. 1 to 4 includes a cylindrical silencer body 1, the walls of which are pierced inwardly as at 2 to form a multiplicity of inwardly directed nipples 3. As is most clearly shown in Fig. 4, the nipples 3 define a Venturi-shaped passage opening between the surfaces of the body. Positioned within the silencer body 1 are a series of Venturi-shaped baffles 4 which are positioned in nested relationship with the smaller end 5 of one baffle nested within the larger end 6 of an adjacent baffle. The walls of the baffles 4 are pierced outwardly to form a multiplicity of outwardly directed Venturi-shaped nipples 7 similar to the nipples in the body of the silencer. It will be noted particularly from Fig. 3 that the large ends 6 of the baffles 4 terminate substantially flush with the inner ends of the inwardly directed nipples 3 in the silencer body, thus leaving an annularly arranged series of openings 8 between the periphery of the baffles and the inner surface of the body 1.

Positioned around the silencer body 1 is an elongated spiral conduit having an inner wall 9 and an outer wall 10. The walls 9 and 10 terminate at a generally vertical rectangular mouth 11 which is positioned above the cowl portion of the automobile so as to be in the slip stream of air passing over the automobile. The walls 9 and 10 converge progressively around the silencer body 1 with the inner wall 9 being joined to the body 1 along an element of the cylindrical body as at 12. The outer wall 10 continues around the silencer and is joined to the inner wall 9 as at 13 to complete a spiral passage 14 of progressively diminishing cross section open to substantially the entire periphery of the silencer 1.

A filter packing 15 consisting of metal turnings or fiber-like particles is retained in the passage 14 by a suitable wire mesh 16 and the packing 15 is located between the mouth 11 of the intake and the apertures 2 in the silencer body. A transversely extending oil pipe 17 illustrated in Fig. 3 extends across the upper side of the filter packing 15 and is provided with a series of apertures 18 in its under side through which oil may drip to saturate the metal turnings or fibers of the filter. The pipe 17 extends through one end of the inlet casing as shown in Fig. 2 and is provided with a covered filler opening 19 through which oil may be introduced into the pipe. The density of the filter packing 15 must of course not be so great as to overcome the supercharging effect of the forwardly facing inlet mouth of the spiral conduit. In other words the spiral passage must be left sufficiently open to transmit the air from the mouth to the interior silencer without material loss of pressure in the air stream. This may be accomplished by leaving the filter packing of relatively open character as is common with filtering masses of this type.

It will be noted from Figs. 2 and 3 that the outer wall 10 of the inlet casing is divided near the bottom of the casing and provided with a lip 20 which extends toward the open end of the casing in spaced relationship from the bottom of the outer wall 10. The bottom of the outer wall is provided with two downwardly opening discharge pipes 21 which open to the inside of the casing below the lip 20.

From the foregoing description it will be apparent that as the automobile moves forwardly the slip stream of air around the body of the automobile will create a pressure at the mouth 11 of the supercharger and induce a flow of air under pressure through the spiral passage 14. Due to the circular path of flow of the air in the passage a large portion of the dust and heavier particles in the air will be thrown automatically against the outside wall 10 and carried between the lip 20 and the outer wall to the discharge pipes 21. The remainder of the air will be directed through the converging passage to the filter packing 15 which will remove any residual fine dust particles. A screen 22 may be provided in the mouth 11 for preventing the entry of insects and other large particles.

After emerging through the filter packing 15 the air under pressure will make entry through the several nipples 3 in the silencer body from where it will pass around or through the several baffles 5 to a tubular throat 23 at one end of the silencer body. The throat 23 is connected by the tubular conduit 24 to the inlet 25 of the carburetor 26 so that the air will be supplied under pressure and in a clean filtered condition to the carburetor.

As the speed of the automobile increases with the concurrent increased demand for power from the engine there will be a corresponding increase in pressure at the mouth 11 of the supercharger due to the increased velocity of the slip stream. This increased pressure will be transmitted directly to the carburetor to assure an increased supercharging effect on the engine to provide a portion of the increased power demand and to improve the efficiency of the engine at high vehicle speeds. We have found that a cross sectional area of approximately 30 square inches at the mouth 11 of the supercharger combined with a cross sectional area of approximately 4 square inches in the conduit 24 and inlet of the carburetor provides an efficient supercharger and converts the pressure head of air at the mouth 11 to a desired pressure and velocity head at the inlet to the carburetor for efficient operation of the carburetor. The total effective area of the several passages through and within the silencer 1 is between the areas of the mouth 11 and conduit 24 and preferably slightly larger than the cross sectional area of the spiral passage 14 where it enters the filter packing 15. Thus the silencer 1 operates to break up and divide the air stream and prevent the transmission of engine and carburetor intake noises through the supercharger without creating undue resistance to the flow of air through the silencer.

In order to assure operation of the engine should the mouth 11 become temporarily clogged with ice or other foreign material the end of the supercharger casing opposite from the conduit 24 is provided with an opening 27 closed by the spring pressed valve 28 and communicating when the valve is open with the open end of the silencer body 1. The spring 29 is of relatively light compressive strength and should the mouth 11 become clogged the suction of the engine will open the valve 28 and permit air to enter through the opening 27. An emergency supply of air for the engine can also be drawn through the outlet pipes 21 if the mouth of the supercharger is clogged.

The form of the supercharger illustrated in Fig. 5 includes a generally cylindrical casing 30 arranged to fit around and enclose the familiar type of air cleaner 31 presently in use on most automotive engines. The casing 30 is provided with an inlet tube 32 to which is connected the flexible conduit 33. The conduit 33 is carried forwardly of the radiator 34 and provided with a funnel-shaped mouth 35 positioned directly behind the grill of the automobile and facing forwardly to receive the full impact of the slip stream of the automobile.

We have thus described two highly efficient forms of our supercharger so that others may reproduce or adapt the same to various makes and models of automotive vehicles either as accessories to existing models or as parts of newly designed vehicles. The superchargers function to increase the efficiency of the carburetor and engine at intermediate and higher operating speeds when increased efficiency is particularly desired without interfering with the idling speeds of the vehicle.

Having thus described our invention what we claim as new and desire to secure by Letters Patent is:

1. An air induction device for the engine of an automotive vehicle comprising a cylindrical silencer body having a multiplicity of inwardly directed nipples opening therethrough, said nipples having Venturi-like cross sections, a plurality of Venturi-shaped baffles positioned within said body in nested relationship and having their outer edges spaced from the inner surface of said body, the walls of said baffles defining a multiplicity of outwardly directed nipples having Venturi-shaped passages therethrough, a conduit connecting one end of said body to the carburetor of said engine, a casing surrounding said body and defining a spirally disposed passage diminishing in cross sectional area and communicating with the outside of said body, said casing having an inlet mouth positioned in the slip stream of the vehicle, a filter packing positioned within said spiral passage adjacent to said body, and a spirally disposed lip projecting into said passage and toward the mouth thereof to form a dirt collecting pocket along the periphery of said passage, said casing defining an outlet opening opposite said lip, said conduit having an area of between 10 and 15 per cent of the area of said mouth.

2. An air induction device for the engine of an automotive vehicle comprising a cylindrical silencer body having a multiplicity of inwardly directed nipples opening therethrough, said nipples having Venturi-like cross sections, a plurality of Venturi-shaped baffles positioned within said body in nested relationship and having their outer edges spaced from the inner surface of said body, the walls of said baffles defining a multiplicity of outwardly directed nipples having Venturi-shaped passages therethrough, a conduit connecting one end of said body to the carburetor of said engine, a casing surrounding said body and defining a spirally disposed passage diminishing in cross sectional area and communicating with the outside of said body, said casing having an inlet mouth positioned in the slip stream of the vehicle, a filter packing positioned within said spiral passage adjacent to said body, and a spirally disposed lip projecting into said passage and toward the mouth thereof to form a dirt collecting pocket along the periphery of said passage, said casing defining an outlet opening opposite said lip.

3. An air induction device for the engine of an automotive vehicle comprising a cylindrical silencer body having a multiplicity of inwardly directed nipples opening therethrough, said nipples having Venturi-like cross sections, a plurality of Venturi-shaped baffles positioned within said body in nested relationship and having their outer edges spaced from the inner surface of said body, the walls of said baffles defining a multiplicity of outwardly directed nipples having Venturi-shaped passages therethrough, a conduit connecting one end of said body to the carburetor of said engine, a casing surrounding said body and defining a spirally disposed passage diminishing in cross sectional area and communicating with the outside of said body, said casing having an inlet mouth positioned in the slip stream of the vehicle, a filter packing positioned within said spiral passage adjacent to said body, a spirally disposed lip projecting into said passage and toward the mouth thereof to form a dirt collecting pocket along the periphery of said passage, said casing defining an outlet opening opposite said lip, and a spring pressed relief valve in said casing opening to the end of said body.

4. An air induction device for the engine of an automotive vehicle comprising a cylindrical silencer body having a multiplicity of inwardly directed nipples opening therethrough, a plurality of baffles positioned within said body and having their outer edges spaced from the inner surfaces of said body, the walls of said baffles defining a multiplicity of outwardly directed nipples having passages therethrough, a conduit connecting one end of said body to the carburetor or said engine, a casing surrounding said body and defining a spirally disposed passage diminishing in cross sectional area and communicating with the outside of said body, said casing having an inlet mouth positioned in the slip stream of the vehicle, a filter packing positioned within said spiral passage adjacent to said body, and a spirally disposed lip projecting into said passage and toward the mouth thereof to form a dirt collecting pocket along the periphery of said passage, said casing defining an outlet opening opposite said lip.

5. An air induction device for the engine of an automotive vehicle comprising a tubular silencer body having a multiplicity of inwardly directed nipples opening therethrough, a plurality of baffles positioned within said body and having their outer edges spaced from the inner surfaces of said body, the walls of said baffles defining a multiplicity of passages therethrough, a constantly open conduit connecting one end of said body to the carburetor of said engine, a casing surrounding said body and defining a spirally disposed passage diminishing in cross sectional area and communicating with the outside of said body, said passage having a constantly open rectangular inlet mouth along the side of said casing and positioned in facing relation to the slip stream of the vehicle, a filter packing positioned within said spiral passage adjacent to said body, and a lip projecting into said passage from the outer wall thereof and toward the mouth thereof to form a dirt collecting pocket along the periphery of said passage, said casing defining an outlet opening opposite said lip.

HARLEY A. DORMAN.
DOUGLAS P. DORMAN.

References Cited in the file of this patent

UNITED STATES PATENTS

| Number | Name | Date |
|---|---|---|
| 1,530,645 | Brockway | Mar. 24, 1925 |
| 1,553,249 | Le Grain | Sept. 8, 1925 |
| 1,791,732 | Manchester | Feb. 10, 1931 |
| 1,957,919 | Tice | May 8, 1934 |
| 2,197,503 | Martin | Apr. 16, 1940 |